United States Patent [19]

Scherer et al.

[11] 3,977,207

[45] Aug. 31, 1976

[54] FREEZE THROTTLING VALVE

[75] Inventors: Carl A. Scherer, Clarence Center; Hugh J. Muirhead, Lockport, both of N.Y.

[73] Assignee: General Motors Corporation, Detroit, Mich.

[22] Filed: June 23, 1975

[21] Appl. No.: 589,472

[52] U.S. Cl. .................................. 62/217; 236/98
[51] Int. Cl.² ..................... F25D 21/00; F25B 41/04
[58] Field of Search ................ 62/217, 216; 236/99, 236/93, 100, 98

[56] References Cited
UNITED STATES PATENTS

| | | | |
|---|---|---|---|
| 3,808,830 | 5/1974 | Atkinson et al. | 62/217 |
| 3,824,802 | 7/1974 | Scherer et al. | 62/217 |

*Primary Examiner*—William E. Wayner
*Attorney, Agent, or Firm*—K. H. MacLean, Jr.

[57] ABSTRACT

An improved thermally responsive freeze actuator for operation of an air conditioning throttle valve between the evaporator and compressor to maintain the pressure and temperature of evaporator refrigerant above a freezing level. The improved actuator includes a rigid-walled tubular portion containing water and an attached axially extendable bellows portion. The water in the tubular portion is separated from the bellows portion by a deep cup shaped member or diaphragm of elastomeric material. The deep pocket of the diaphragm encloses one end of a push rod. As the water surrounding the pocket portion of the diaphragm changes to ice the rod is moved axially from the tubular portion. The other end of the rod engages the bellows which may be stationary mounted to a frame member to cause the entire actuator to move with respect to a valve seat.

2 Claims, 2 Drawing Figures

FREEZE THROTTLING VALVE

This invention relates to an improved thermally responsive freeze actuator particularly adapted for operation of a throttling valve in an air conditioning system to control evaporator temperatures and pressures.

The subject invention includes an actuator within an accumulator located between the evaporator and compressor of an air conditioning system. The improved actuator has a valve portion thereon which moves with respect to a valve seat in response to movements of the actuator caused by ice formation within the actuator's interior. More specifically, the actuator includes an elongated and rigid tubular portion containing water which is attached to a flexible bellows portion capable of axial extensions and contractions. The actuator includes a diaphragm of elastomeric material between the portions to separate the water-filled interior of the tubular portion from an air-filled interior of the bellows. By limiting ice formation to the interior of the rigid walled portion damage to the bellows portion is avoided. The diaphragm has a centrally positioned socket portion which extends into the interior of the tubular portion. One end of a push rod is enclosed within the deep socket and the other end engages the interor of the bellows. As ice forms within the tubular portion, the resultant expansive pressure acts upon the end of the pocket portion of the diaphragm to move the end of the push rod toward the bellows portion and thereby cause axially extension of the elongated actuator.

A characteristic of the improved freeze actuator is the provision of a relatively snug fit between the inner diameter of the tubular portion and the outer diameter of the diaphragm pocket portion. Sufficient clearance is maintained to permit the pocket portion to be compressed axially as the push rod moves of the tubular portion. Nevertheless, the spacing should not be such as to cause binding engagement or rigid bridging when ice forms therebetween.

The utilization of a diaphragm having a deep central pocket portion encircling the end of the activating or push rod will provide smooth operation.

The balanced pressure forces on the sides of the diaphragm pocket will be transmitted to the rod so as to cause it to move in a true axial direction without lateral deflection.

The aforedescribed improved freeze actuator provides a compact, simple and reliable valve unit for an air conditioning system. For more details of the operation of another embodiment of a freeze actuator within a liquid accumulator of an air conditioning system, reference is hereby made to U.S. Pat. No. 3,798,921 to Scherer et al, which issued Mar. 26, 1974 and is assigned to the General Motors Corporation.

Other advantages of the improved freeze actuated valve will be more readily apparent from the following detailed description, reference being had to the accompanying drawings, in which a preferred embodiment is clearly shown.

Figure 1:
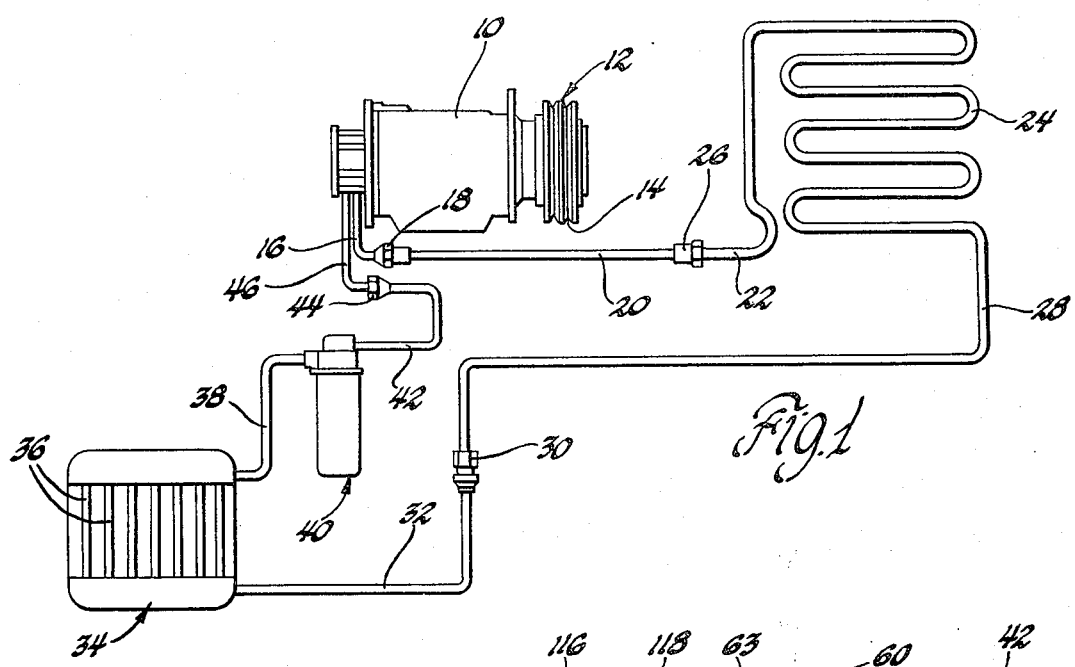
FIG. 1 is a schematic illustration showing an automobile air conditioning system.

In FIG. 1 of the drawings, an air conditioning system including a refrigerant compressor 10 is illustrated. The shaft of the compressor 10 is connected to a pulley assembly 12 which is driven by the engine of the automobile through V-type belts (not shown) which engage grooves 14 of the pulley. The outlet 16 of compressor 10 is attached by connector 18 to a flexible hose 20 which is connected to the inlet 22 of the condensor 24 by connector 26. The condensor 24 is most conveniently located near the front of the vehicle so that it is exposed to a flow of air through the grille for cooling and liquifying warm refrigerant discharged from the compressor. The outlet 28 of the condensor 24 is fluidly connected to an orifice tube type expander 30 which decreases the pressure of liquid refrigerant. For more details of the structure of the orifice type expander shown in FIG. 1, reference is made to U.S. Pat. No. 3,815,379 to Scherer which issued June 11, 1974 and is assigned to the General Motors Corporation.

The orifice expander 30 is connected to the inlet 32 of an evaporator 34. Liquid refrigerant in the evaporator is vaporized in parallel vertical passes 36, each having fluid-conveying portions and exterior finned surfaces formed therewith. The evaporator 34 has an outlet 38 which is connected to an inlet of a liquid accumulator 40. The accumulator 40 separates liquid from vaporous refrigerant and discharges the vaporous refrigerant through an outlet into a suction line 42. Line 42 is connected by connector 44 to the inlet 46 of compressor 10.

Figure 2:
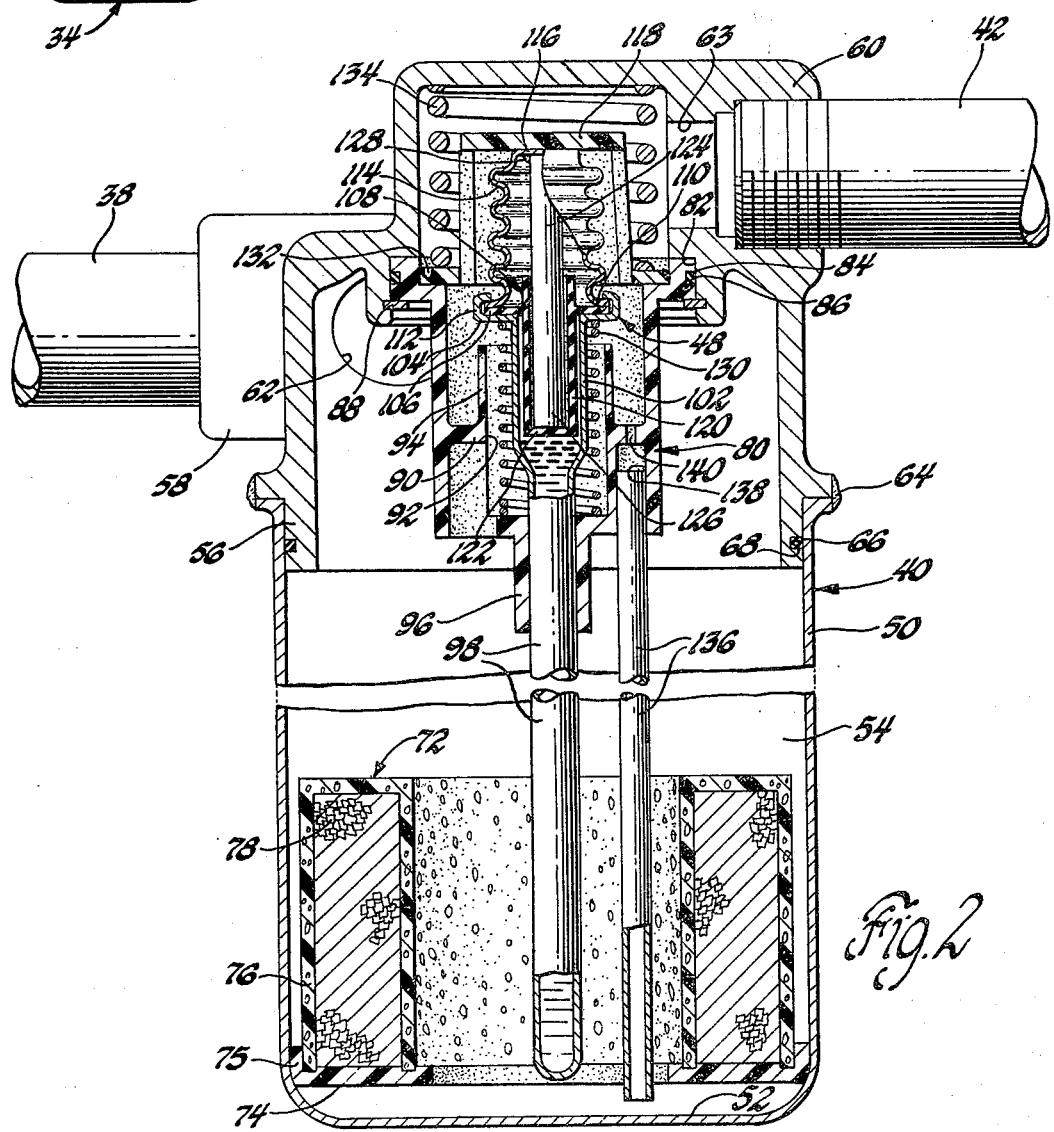
FIG. 2 is a vertical sectioned view of the liquid accumulator shown in FIG. 1, which supports the subject freeze actuated valve.

As previously explained, when the air conditioning system is operated under relatively low ambient temperature conditions, the heat transferred from the relatively cool air flowing over the evaporator 34 is usually insufficient to adequately vaporize the quantity of refrigerant discharged by compressor 10. The resultant build up of liquid tends to decrease the internal pressure of the evaporator below the corresponding fluid temperature necessary to prevent frost from forming upon the exterior surfaces of the evaporator. The subject freeze throttling valve assembly 48 (see FIG. 2) within the accumulator 40 controls or restricts refrigerant flow from the evaporator under these conditions to increase the pressure and corresponding temperature of refrigerant.

The accumulator 40 consists of a cup shaped member 50 with a closed bottom end 52 and an interior space or chamber 54. An open upper end of the member 50 is covered by an end member or housing 56 which has an inlet portion 58 fluidly connected to the evaporator outlet 38. An outlet portion 60 of member 56 is fluidly connected to the suction line 42 leading to the compressor. An inlet opening 62 in member 58 introduces a mixture of liquid and vaporous refrigerant to interior 54 from the evaporator 34. Refrigerant is discharged from space 54 through an outlet passage 63 in member 56. It then flows through suction line 42 to the inlet 46 of compressor 10.

An edge weld 64 between members 56 and 50 seals refrigerant in interior 54. Other suitable fastening means may be employed, such as brazing or bolting. An O-ring 66 within a groove 68 prevents refrigerant leakage between members 50, 56.

A dessicant assembly 72 is supported in the bottom of the interior space 54 and includes a support member 74 which engages the interior surface of tubular member 50 at edge 75. An outer skin or container 76 of fluid pervious material encloses a quantity of silica gel 78 to absorb moisture which may be mixed with refrigerant.

The refrigerant temperature in the evaporator is directly controlled by movement of the freeze type throttling valve assembly 48 which is supported in space 54 by a valve seat member 80. An upper peripheral edge of member 80 rests in recess 82 formed within member 56. An O-ring 84 within groove 86 prevents refrigerant leakage in bypass relation to the valve 48. The radially expansible retainer 88 holds the valve seat member within the recess 82. Valve seat member 80 includes a partition or wall 90 which has a passage 92 therein with an upwardly extending valve seat forming portion 94 on the upper side of walls 90. Normally, vaporous refrigerant in the interior 54 of the accumulator flows upward through passage 92 to outlet 63 and then through suction line 42 to the inlet 46 of compressor 10.

The valve seat member 80 includes a central tubular portion 96 located upstream from passage 92. Portion 96 encircles and holds a cylindrical or tubular portion 98 of the actuator 48 and permits it to reciprocate axially within the passage 92. The freeze type actuator 48 includes the elongated tubular portion 98 which extends toward the bottom end 52 of accumulator 40. The tubular portion 98 has relatively thick and rigid walls capable of withstanding considerable internal pressure. The upper end of portion 98 is enlarged at 102 to provide an increased diameter internal space and is flanged outward to form an annular edge portion 104 whose bottom surface engages a valve seat portion 94. The flange portion 104 is coplanar with the peripheral edge 106 of a flexible diaphragm member 108 extending across the open upper end of the tubular member 98. Overlying the peripheral edge 106 of the diaphragm 108 is an end member 110 secured against the diaphragm 108 by a spun over edge portion 112 of the flange 104. The end member 110 is attached to one end of an axially extendable and contractable bellows 114 which has relatively thin, and thereby flexible, side walls having a corrugated shape or form. The upper end 116 of the bellows 114 is secured to an override retainer member 118 which axially supports the freeze actuator 48 with respect to the valve seat member 80.

The tubular portion 98 of actuator 48 is filled with water to provide a desirable evaporator temperature control point of about 32°F. occurring when the water changes from solid to liquid or vice-versa. The interior of the bellows 114 is not pressurized so that the flexible side walls may move with respect to one another and permit axial extension and contraction of the actuator 48 and valve surface 104.

The improved freeze actuator 48 utilizes the diaphragm 108 to separate the interiors of the tubular portion 98 and the bellows 114. Diaphragm 108 is of molded elastomeric material impervious to the passage of water and includes a deep central socket or pocket portion 120 whose outer diameter is only slightly less than the inner diameter of enlarged portion 102 of member 98. In a preferred embodiment the difference between diameters may be only about 1/16 to ⅛ of an inch. The slight clearance between the diameters permits formation of evenly distributed lateral forces on the pocket 120. Also the pressure force on the lower end 122 tends to move it upwardly within the tubular portion 98 in response to volumetric expansion of ice. Upward movement of the end 122 of pocket portion 108 exerts a force on the end of a pin or push rod 124 whose lower portion 126 is supported within the interior of the pocket 120. The upper end of the push rod 124 is secured by brazing at 128 to the inside of the bellows 114.

When ice formation occurs, the volumetric expansion will exert a pressure force upon the end 122 and sides of the pocket 120. The pressure force is transmitted through push rod 124 to cause bellows 114 to be axially extended and resultantly move valve portion 104 downward toward valve seat member 94. Conversely, when ice within the tubular portion 98 receeds, the pressure on end 122 decreases and the end 126 of the rod 124 moves back into portion 98 to permit the contraction of bellows 114 and movement of valve 104 away from valve seat 94 which is aided by action of the return spring 130 between portion 104 and the valve seat member 80.

The previously described override retainer 118 supports the upper end of bellows 114 and has a peripheral edge portion 132 which seats against the valve seat member 80 by action of an override spring 134. As the bellows 114 is extended axially, the valve surface 104 moves downward toward valve seat portion 94 to restrict refrigerant flow through passage 92. Once valve surface 104 engages valve seat 94, further axial extension of bellows 114 will cause the retainer's peripheral edge 132 to move upward against spring 134 to accommodate further extension of the bellows. The use of an override retainer 118 and spring 134 relieves pressure on the bellows and provides sufficient flexibility of the valve assembly so that special calibration is unnecessary. The valve assembly will automatically position itself to control fluid flow through passage 92 at a rate sufficient to maintain evaporator temperature at about 32°F. Since the exterior finned surfaces are always warmer than refrigerant in evaporator 34, there is no problem created by frost accumulation at this temperature control point.

As previously explained, compressor 10 is lubricated by oil carried along with refrigerant through the fluid cycle of the air conditioning system. A natural place for oil to collect or accumulate in the system is the bottom of the accumulator 40. Normally, when passage 92 is opened, the flow of refrigerant will carry sufficient oil to the compressor for lubrication. However, when the passage 92 is closed by valve portion 104, sufficient oil may not be carried to the compressor. To provide supplemental flow of oil when valve portion 104 engages valve seat 94, means including an oil pickup tube 136 is utilized. The upper end of the oil pickup tube 136 is grippingly supported by valve seat member 80 which has recess or bore 138 therein. A small orifice 140 creates a pressure differential between the interior 54 of the accumulator and a location downstream from the valve seat member 94. Under influence of this pressure differential, oil is effectively drawn upward through tube 136 from the bottom of the interior space 54 and into the suction line 42.

While the improved embodiment of the freeze actuator as illustrated is a preferred embodiment, other embodiments may be adapted which still are within the scope of the invention as defined by the following claims.

What is claimed is:

1. In an air conditioning system including a compressor for pumping and pressurizing refrigerant, a condensor for cooling and liquifying refrigerant, an expander to reduce refrigerant pressure, an evaporator for cooling air by transmitting heat to liquid refrigerant therein and thereby causing vaporization of refrigerant and refrigerant storage means which also separates refrigerant into liquid and vaporous phases, an improved evaporator temperature control comprising: an elongated valve structure including a housing which is axially extendable and contractable; said housing including an elongated, relatively narrow tubular member having a side wall and a closed end defining an interior filled with water and which side wall is sufficiently rigid to withstand the pressure force produced by ice formation therein to direct pressure forces in an axial direction toward a second end; an outwardly extending annular edge portion on the second end of said tubular member, one surface of which forms a valving surface adapted to engage a valve seat to control fluid flow; a resilient diaphragm member extending across said second end and having a peripheral edge portion overlying said annular edge portion of the tubular member; an axially extendable and contractable member having an outwardly directed flange portion at one end in overlying relation to the peripheral edge portion of said diaphragm member both of which are secured to said annular portion of said tubular member; said flexible member being supported at a second end downstream from said evaporator to locate said valve surface of the tubular member in spaced relation with respect to the valve seat whereby extensions and contractions of the flexible member cause said valve surface to move relative to the valve seat and thereby control refrigerant flow; said diaphragm member having a generally tubular shaped, deep pocket at its mid-portion extending in an axial direction into the interior of said tubular member so that one side is exposed to water therein; a push rod with one end portion extending into said diaphragm pocket and with the other end attached to said flexible member so as to transform the compressive forces on the push rod produced by ice formation within the tubular member into movement of the tubular portion and flexible member thereby causing the valve surface thereon to move in an axial direction.

2. In an air conditioning system including a compressor for pumping and pressurizing refrigerant, a condensor for cooling and liquifying refrigerant, an expander to reduce refrigerant pressure, an evaporator for cooling air by transmitting heat to liquid refrigerant therein and thereby causing vaporization of refrigerant and an accumulator for refrigerant storage which also separates refrigerant into liquid and vaporous phases, an improved evaporator temperature control comprising: an elongated valve structure including a housing which is axially extendable and contractable; said housing including an elongated, relatively narrow tubular member having a side wall and a closed end defining an interior space filled with water and which side wall is sufficiently rigid to withstand the pressure force produced by ice formation therein to direct pressure forces in an axial direction toward a second end; an outwardly extending annular edge portion extending from the second end of said tubular member one surface of which forms a valving surface adapted to cooperate with a valve seat to regulate fluid flow; a resilient diaphragm member extending across said second end with a peripheral portion overlying said edge portion of the tubular member; an elongated bellows member supporting at one end an outwardly directed flange overlying said peripheral edge of said diaphragm both of which are held against said annular portion of said tubular member by retainer means; said bellows having a relatively thin and thereby flexible side wall in corrugated form to impart relative freedom of movement in an axial direction; said actuator being supported at a second end of said bellows so as to normally locate said valve surface with respect to the valve seat so that extensions and contractions of the side wall of the bellows cause relative movement between said valve surface and said valve seat to thereby control refrigerant flow; said diaphragm member having a generally tubular shaped, deep pocket centrally located and extending into the exterior of said tubular member with one side exposed to water therein; a push rod with one end portion extending within said diaphragm pocket and with the other end attached to the end of said bellows so as to transform compressive forces on the push rod produced by ice formation thereby producing movement of the tubular portion and the valve surface thereon.

* * * * *